(12) United States Patent  
Fehr et al.

(10) Patent No.: US 8,833,539 B2  
(45) Date of Patent: Sep. 16, 2014

(54) PORTABLE BELT CONVEYOR SYSTEM

(75) Inventors: Corbin J. Fehr, Morris, MN (US); Bruce J. Berlinger, Morris, MN (US); Jarrod J. Felton, Cyrus, MN (US)

(73) Assignee: Superior Industries, Inc., Morris, MN (US)

( * ) Notice: Subject to any disclaimer, the term of this patent is extended or adjusted under 35 U.S.C. 154(b) by 569 days.

(21) Appl. No.: 13/199,754

(22) Filed: Sep. 8, 2011

(65) Prior Publication Data

US 2012/0138423 A1 Jun. 7, 2012

Related U.S. Application Data

(60) Provisional application No. 61/403,277, filed on Sep. 13, 2010.

(51) Int. Cl.
| | |
|---|---|
| *B65G 21/14* | (2006.01) |
| *B65G 41/00* | (2006.01) |
| *B65G 39/16* | (2006.01) |

(52) U.S. Cl.
CPC .............. *B65G 21/14* (2013.01); *B65G 39/16* (2013.01); *B65G 41/008* (2013.01)
USPC ............ 198/313; 198/812; 198/632; 198/830

(58) Field of Classification Search
USPC .......................... 198/313, 812, 632, 830, 825
See application file for complete search history.

(56) References Cited

U.S. PATENT DOCUMENTS

| | | | | | |
|---|---|---|---|---|---|
| 2,576,217 | A | * | 11/1951 | Eggleston | 198/313 |
| 2,678,125 | A | * | 5/1954 | Bonney, Jr. | 198/812 |
| 3,825,107 | A | * | 7/1974 | Cary et al. | 198/313 |
| 4,050,542 | A | * | 9/1977 | Wilson | 182/10 |
| 4,260,053 | A | * | 4/1981 | Onodera | 198/812 |
| 5,181,600 | A | * | 1/1993 | Chappell et al. | 198/812 |
| 6,708,814 | B2 | * | 3/2004 | Wagstaffe | 198/632 |
| 7,308,968 | B2 | * | 12/2007 | Denison | 182/42 |
| 7,823,715 | B2 | * | 11/2010 | Kinnunen et al. | 198/313 |

* cited by examiner

*Primary Examiner* — Mark A Deuble
(74) *Attorney, Agent, or Firm* — Dicke, Billig & Czaja, PLLC

(57) ABSTRACT

A belt conveyor system for creating an overland material transport assembly on a ground surface comprises a frame configured for transportation over the ground surface, a plurality of pivotally connected conveyor belt support sections, a head pulley assembly mounted to the first end of the frame, a tail pulley assembly mounted to one of the conveyor belt support sections, and a conveyor belt. The plurality of pivotally connected conveyor belt support sections are supportable on the frame in a transport configuration wherein the plurality of support sections are accordion-folded relative to one another. The plurality of pivotally connected conveyor belt support sections are movable to a material transport configuration wherein the plurality of support sections are unfolded.

1 Claim, 11 Drawing Sheets

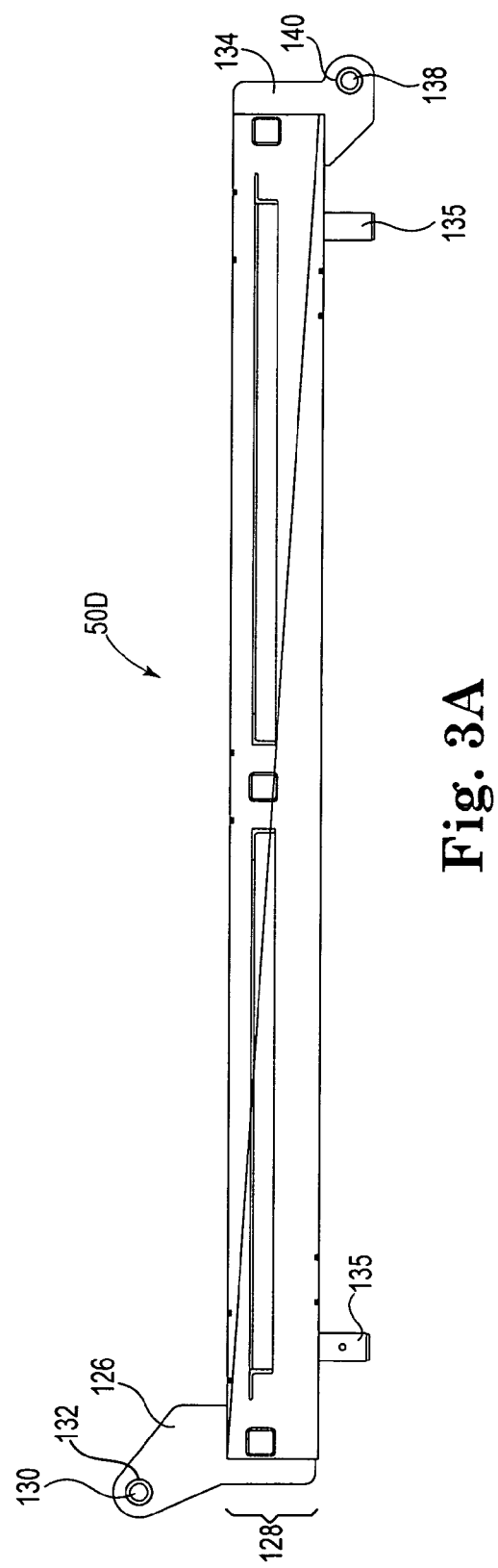

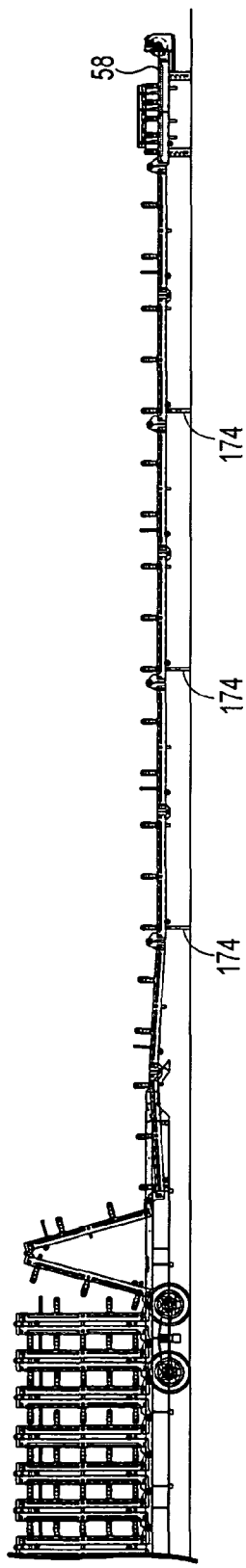

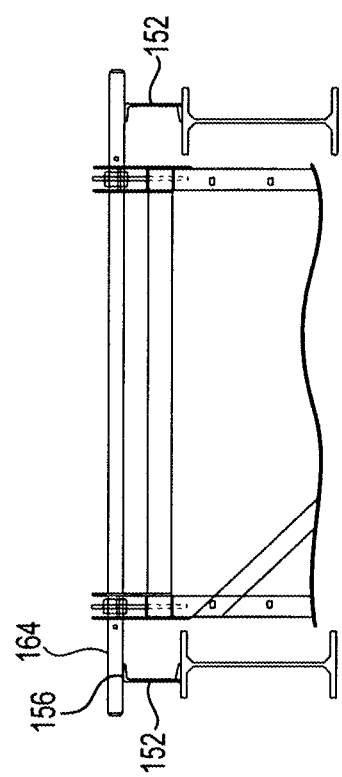

PORTABLE BELT CONVEYOR SYSTEM

This application claims priority of U.S. Provisional Patent Application Ser. No. 61/403,277, filed on Sep. 13, 2010. The subject matter of the earlier filed application is hereby incorporated by reference.

BACKGROUND

The present invention generally relates to belt conveyor equipment. More specifically, the present invention relates to a portable belt conveyor system for creating an easy to assemble and disassemble overland bulk material belt conveyor assembly.

Belt conveyors are employed to transport material from one end of a conveyor to another end of the conveyor. To transport material over a relatively long distance at a desired work site, one approach is to construct a belt conveyor assembly that is permanently mounted on the ground. A limitation of such belt conveyor assemblies is the cost and time associated with constructing the conveyor assembly, as well as the lack of mobility of the conveyor system in the event there is a need or desire to relocate to a new work site. There is a need for a portable belt conveyor system that is relatively fast, easy and inexpensive to set up for long distance transport of material and yet is also relatively fast, easy and inexpensive to transport to a new location.

SUMMARY

A belt conveyor system for creating an overland material transport assembly on a ground surface comprises a frame configured for transportation over the ground surface, a plurality of pivotally connected conveyor belt support sections, a head pulley assembly, a tail pulley assembly and a conveyor belt. The frame comprises a first end, a second end and first and second elongate rails, each of the first and second elongate rails having a first support surface and a second support surface spaced from the first support surface. The plurality of pivotally connected conveyor belt support sections are supportable on the frame in a transport configuration wherein the plurality of support sections are accordion-folded relative to one another and are generally perpendicular to the first and second elongate rails. The plurality of pivotally connected conveyor belt support sections are movable to a material transport configuration wherein the plurality of support sections are generally parallel to the first and second rails. The head pulley assembly is mounted to the first end of the frame. The tail pulley assembly is mounted to one of the conveyor belt support sections. The belt conveyor is carried by the head pulley assembly, the plurality of conveyor belt support sections and the tail pulley assembly.

BRIEF DESCRIPTION OF THE DRAWINGS

FIG. 3A is a side view of the second conveyor belt support section of FIG. 3.

FIG. 5 is a partial side view of the portable belt conveyor system of FIG. 1 in a partially deployed condition.

FIG. 5B is a partial cross-sectional view of the trailer of FIG. 5A with a pivot rod that joins adjacent conveyor belt support sections resting on a channel beam of the trailer.

DETAILED DESCRIPTION

Figure 1:
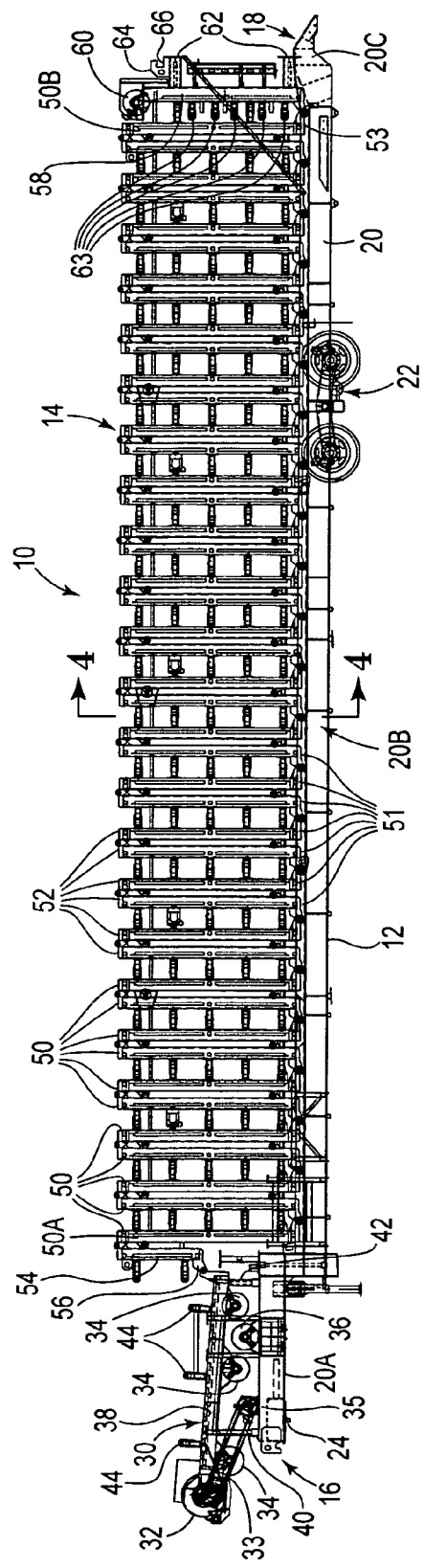
FIG. 1 is a side view of the portable belt conveyor system of the present invention.

FIG. 1 is a side view of the portable groundline 10 of the present invention in a transport configuration. Portable groundline 10 is generally comprised of a transport trailer 12 and a belt conveyor assembly 14 carried on the trailer 12. The transport trailer 12 includes a front end 16 and a rear end 18 and a pair of support beams 20 that extend generally therebetween. Connected to support beams 20 in one embodiment is a tandem axle wheel assembly 22, which enables portable groundline 10 to be road transportable. In an alternate embodiment, wheel assembly 22 can be replaced with skids or other transportation means for transport of portable groundline over rough terrain.

As shown in FIG. 1, the support beams 20 comprise a front support beam portion 20A, which is stepped above a main support beam portion 20B, and a ramp portion 20C that is connected to the main support beam portion 20B adjacent to the rear end 18. The front support beam portion is configured with a king pin 24 adjacent to front end 16 for connection to a fifth wheel hitch on a towing vehicle (not shown). Mounted to the upper surface of the front support beam portion 20A is a head conveyor section 30 of the belt conveyor assembly 14. The head conveyor section 30 is comprised of a head pulley 32, return idler pulleys 34, and a tension pulley 36, all of which are supported on a head conveyor frame 38. The head pulley 32 is connected via a drive belt 33 to a motor 35 mounted on the main support beam portion 20B. Head conveyor frame 38 is supported at angle relative to the front support beam portion 20A by supports 40 and 42, which elevate the head pulley 32. A plurality of trough idlers 44 are mounted on an upper surface of the head conveyor frame 30 in a conventional manner to support a conveyor belt (not shown).

As further shown in FIG. 1, in the transport configuration, a plurality of "accordion-folded" conveyor belt support sections 50 of belt conveyor assembly 14 are supported on the main support beam portion 20B. Each conveyor belt support section 50 comprises a metal frame that has a first end 52 and a second end 51. Each end 52 and 51 is configured to pivotally connect the respective adjacent ends of adjacent conveyor belt support sections 50 and allow conveyor belt support sections 50 to move from the transport configuration (i.e., generally perpendicular to main support beam section 20B) to a deployed, linear configuration (i.e., generally parallel to main support beam section 20B) as subsequently will be more fully disclosed. The conveyor belt support section 50A closest to head conveyor section 30 has its first end 52 pivotally connected to a relatively short linking conveyor belt support section 54, which in turn is connected to head conveyor section 30 via pivotal connection 56. The conveyor belt support section 50B closest to rear end 18 is pivotally connected at its second end 53 to a tail conveyor frame 58 comprised of a tail pulley 60 mounted opposite the second end 53. Four support legs 62 (two of which are shown) are mounted relative to tail conveyor frame 58 to support tail conveyor frame 58 on the ground when portable groundline 10 is in a deployed configuration. In one embodiment, a metal plate 64 configured to define a rearward facing notch 66 is connected to the two upper-most legs 62, as shown. Metal plate 64 allows a bucket loader or similar hydraulically operated heavy equipment to engage notch 66 with the leading edge of a bucket to lower the tail conveyor frame 58 to the ground. The tail conveyor frame 58 is equipped with a standard load zone conveyor belt support assembly 63 to support a conveyor belt at a location where bulk material is to be deposited on the portable groundline 10.

Figure 2:
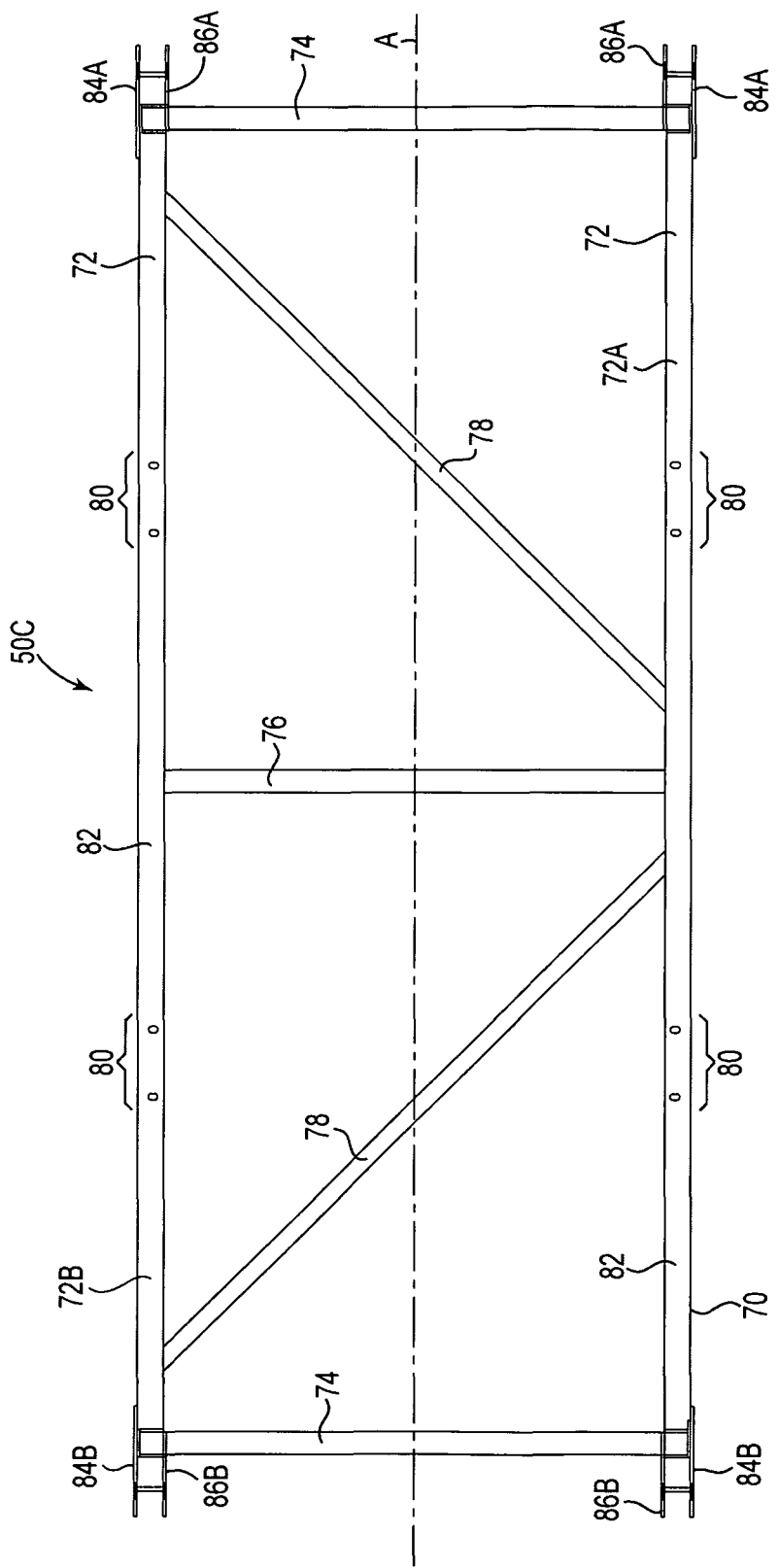
FIG. 2 is a top view of a first conveyor belt support section of the portable belt conveyor system of FIG. 1.
Figure 2A:
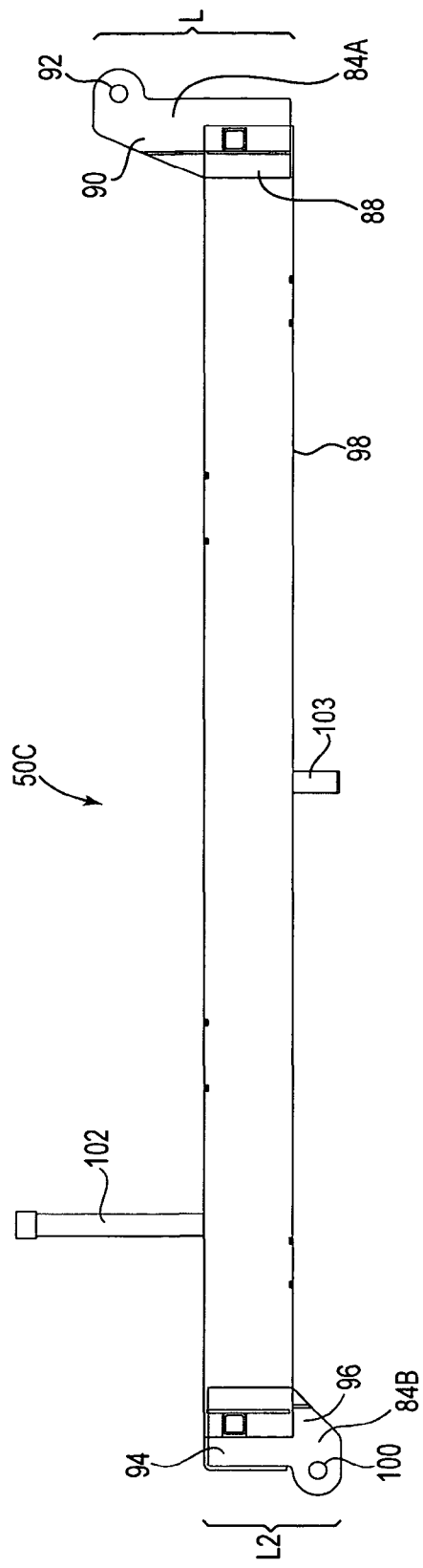
FIG. 2A is a side view of the first conveyor belt support section of FIG. 2.

FIG. 2 is a top view of a first conveyor belt support section 50C. FIG. 2A is a side view of the first conveyor belt support section 50C of FIG. 2. As shown in FIG. 2, a first conveyor belt support section 50C comprises a rectangular metal frame 70 having a pair of side frame members 72 and a pair of end frame members 74. Frame 70 is supported by a central metal brace 76 located generally midway between end frame members 74 and secured to side frame members 72, such as by welding. The side frame members 72 of frame 70 may further be braced by two angled metal braces 78, one on either side of central brace 76 and generally extending from side frame member 72A adjacent to central brace 76 toward side frame member 72B adjacent to end frame members 74. Angled metal braces 78 may be secured to side frame members 72 such as by welding. Each side frame member 72 is provided with a pair of mounting holes 80 on the upper side 82 of side frame member 72 on either side of central brace 76 for mounting a trough idler assembly (not shown).

Figure 2B:
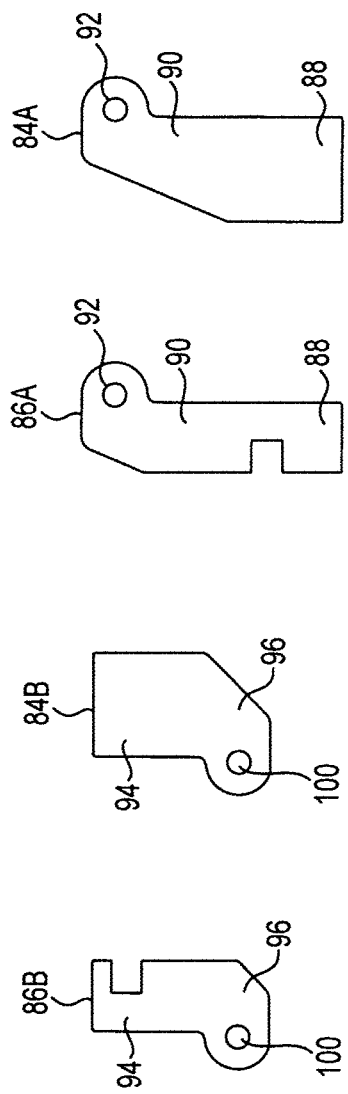
FIG. 2B is a side view of pivot plates for the first conveyor belt support section of FIGS. 2 and 2A.

As shown in FIGS. 2 and 2A, connected to side frame members 72 at each corner of conveyor belt support section 50C are a pair of pivot plates 84, 86 configured to define a pivotal connection of adjacent conveyor belt support sections 50. Pivot plates 84A, 86A are located at one end conveyor belt support section 50C, and pivot plates 84B, 86B are located at an opposite end of conveyor belt support section 50C. Pivot plate 84A has a length L greater than a width of side frame member 72 such that a first portion 88 is secured to a first side surface of side frame member 72, such as by welding, and a second portion 90 extends above the upper surface 82 of side frame member 72. As shown in FIG. 2B, pivot plate 86A is configured with a notch in the first portion 88 that allows pivot plate 86A to be aligned with pivot plate 84A with the notch positioned around the end frame member 74. Pivot plate 86A is secured to a second side of side frame member 72 by welding. Each pivot plate 84A, 86A is provided with a pivot hole 92 that is spaced above the upper surface 82. Pivot holes 92 receive a pivot pin to define a transverse pivot connection relative to a longitudinal axis A of convey belt support section 50C to pivotally connect adjacent conveyor belt support sections 50 and allow relative movement of conveyor belt support sections 50 along axis A.

Pivot plates 84B, 86B also have a length L2 that is greater than the width of side frame member 72, with a first portion 94 secured to the first side surface of side frame member 72 by welding, and a second portion 96 that extends below the lower surface 98 of side frame member 72. Pivot plate 86B is configured with a notch in first portion 94 (FIG. 2B) that is sized and shaped to fit around end frame member 74 and allow pivot plate 86B to be aligned with pivot plate 84B and welded to side frame member 72. Pivot plates 84B, 86B are also provided with a pivot hole 100 that is spaced below the lower surface 98 of side frame member 72, although the distance between pivot holes 100 relative to lower surface 98 is less than the distance between pivot holes 92 relative to upper surface 82. Welded to upper surface 82 of each side frame member 72 adjacent to pivot plates 84B, 86B is a metal tube 102, which extends generally perpendicular to side frame member 72. Tube 102 has a length selected to contact the upper surface of an adjacent conveyor belt support section 50 when the portable groundline 10 is in the transport configuration (FIG. 1). Likewise, a relatively short metal tube 103 is welded to the lower surface 98 of each side frame member 72 midway between the ends of side frame member 72 and extends generally perpendicularly to contact the lower surface of an adjacent conveyor belt support section 50 when portable groundline 10 is in the transport configuration. Tubes 102 and 103 prevent relative movement of conveyor belt support sections 50 when portable groundline 10 is being transported.

Figure 3:
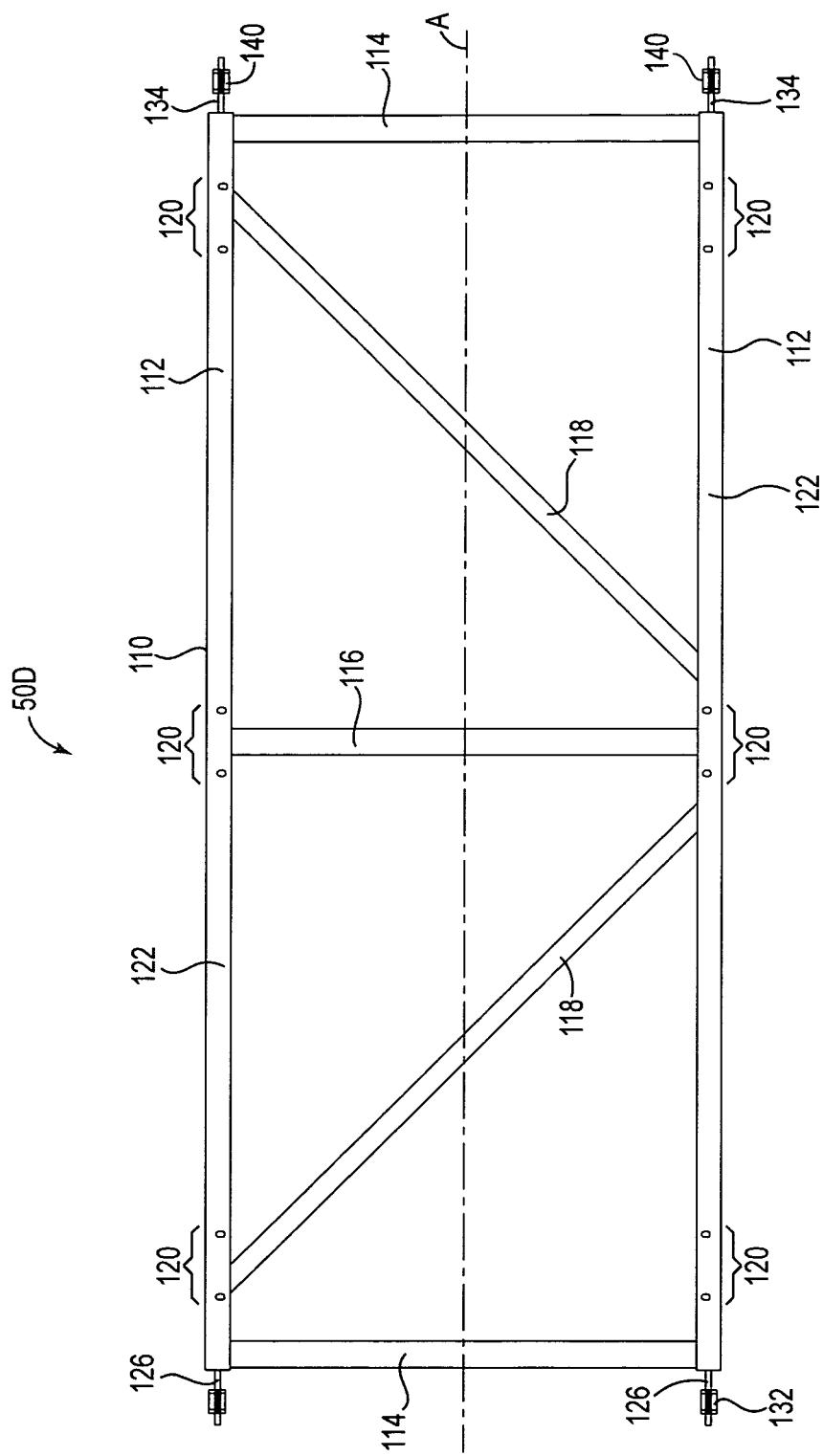
FIG. 3 is a side view of a second conveyor belt support section of the portable belt conveyor system of FIG. 1.

FIG. 3 is a top view of a second conveyor belt support section 50D that is configured to pivotally connect to first conveyor belt support sections 50C. FIG. 3A is a side view of the second conveyor belt support section 50D of FIG. 3. In general, the second conveyor belt support section 50D is comprised of a generally rectangular frame 110 that is constructed of side frame members 112, end frame members 114, a central metal brace 116 and two angled metal braces 118 in substantially similar manner and dimensions as frame 70 of the first conveyor belt support section 50C. Unlike frame 70, however, frame 110 is configured with three sets of mounting holes 120 in the upper surface 122 of each side frame member 112, with first and second mounting hole sets adjacent to respective opposite ends of side frame member 112 and a third mounting hole set centered relative to the central metal brace 116. Mounting holes 120 serve to mount a trough idler assembly to the upper surface 122 at locations that straddle the trough idler assemblies of the first conveyor belt support section 50C when conveyor belt support sections 50 are in the transport configuration (FIG. 1).

As further shown in FIGS. 3 and 3A, each first end of side frame members 112 is fitted with a single pivot plate 126 that is generally oriented and configured in mirror image to pivot plates 84A, 86A. Pivot plates 126 include a first portion configured to define a 90 degree angle mounting edge that is complimentary to the first end and upper surface of each side frame member 112. Pivot plates 126 are centered on the first end relative to the opposite sides of side frame member 112 and are secured thereto by welding. A pivot hole 130 formed through pivot plates 126 is fitted with a bushing 132. To pivotally connect conveyor belt support section 50D with conveyor belt support section 50C, each pivot plate 126 is positioned between pivot plates 84A, 86A with pivot hole 130 and bushing 132 aligned with the pivot holes 92 of pivot plates 84A, 86A. A pivot pin passes through pivot holes 92, 130 and bushing 132 to pivotally join the adjacent conveyor belt support sections together.

Likewise, each second end of side frame members 112 is fitted with a single pivot plate 134 that is generally oriented and configured in mirror image to pivot plates 84B, 86B of the first conveyor belt support section 50C. As shown in FIG. 3A, each pivot plate 134 is also configured with a mounting edge formed at a 90 degree angle to allow pivot plate 134 to mate with the second end of each side frame members 112. As with pivot plates 126, pivot plates 134 are centered on the end of frame members 112 relative to the opposite sides of frame members 112 and secured thereto by welding. A pivot hole 138 is formed in pivot plate 134 and a bushing 140 is secured therein for mounting pivot plate 134 to pivot plates 84B, 86B. An additional pair of tubes 135 sized similarly to tubes 103 on the side frame members 72 of conveyor belt support section 50C are mounted to the lower surface of each side frame member 112 adjacent to each end thereof to provide additional stabilization of conveyor belt support sections when they are in the transport configuration.

Figure 4:
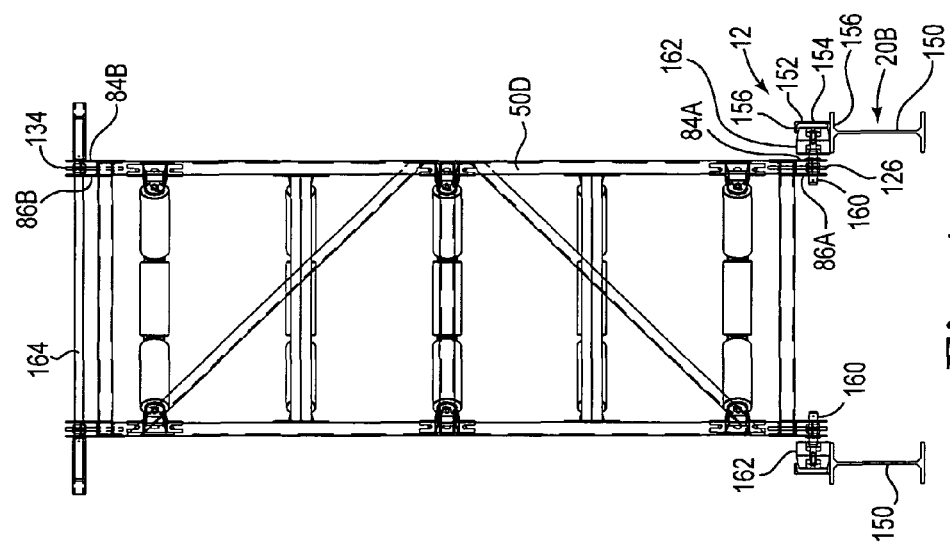
FIG. 4 is a cross-sectional view of the portable belt conveyor system of FIG. 1 taken along line 4-4.

FIG. 4 is a cross-sectional view of the portable groundline 10 showing one pair of conveyor belt support sections 50C, 50D supported in the transport configuration on the main support beam portion 20B of transport trailer 12. As shown in FIG. 4, in one embodiment, the main support beam portion 20B is comprised of a pair of spaced and generally parallel elongate beams 150, which in one embodiment comprises I-beams. Beams 150 define a width greater than a width of frame 110 of conveyor belt support section 50D. Secured to the top wall of each of beams 150 along the length of beams 150 is a channel beam 152 comprised of a base wall 154 and a pair of side walls 156, with one of side walls 156 secured by welding to the top wall of beam 150. Side walls 156 are oriented toward conveyor belt support sections 50C, 50D. As shown in FIG. 4, with pivot plate 126 of conveyor belt support section 50D positioned between pivot plates 84A, 86A of conveyor belt support section 50C, a pivot pin 160 couples the pivot plates and conveyor belt support section 50D to adjacent section 50C. In one embodiment, each pivot pin 160 further carries a metal roller 162 on its outer end, which supports conveyor belt support sections 50 on the top wall of beams 150 and allows for movement of the associated end of support sections 50C, 50D along the main support beam portion 20B to thereby deploy the portable groundline 10.

As further shown in FIG. 4, pivot plate 134 of conveyor belt support section 50D is positioned between pivot plates 84B, 86B of conveyor belt support section 50C and pivotally coupled by a pivot rod 164. Pivot rod 164 has a length greater than the width of beams 150 and serves to support a conveyor belt (not shown) when conveyor belt support sections 50 are in the transport configuration.

Figure 5A:
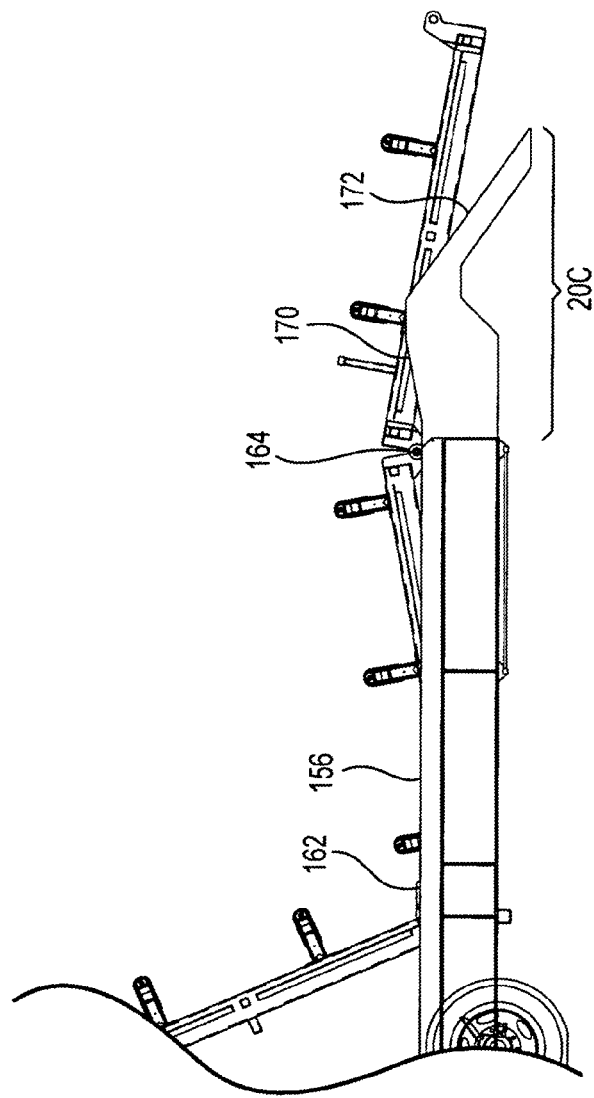
FIG. 5A is partial side view of conveyor belt support sections deploying off a ramp portion of a trailer for the portable belt conveyor system of the present invention.

FIG. 5 is a partial side view of portable groundline 10 being deployed to a fold-out configuration. Groundline 10 is deployed by lowering the tail conveyor frame 58 to the ground. In one embodiment, a front-end loader or similar piece of heavy equipment typically on the site where bulk material is being taken is used to lower the tail conveyor frame and hold it in the lowered position during deployment of groundline 10. With the tail conveyor frame 58 on the ground, a towing vehicle tows the trailer 12 away from tail conveyor frame 58, thereby causing conveyor belt support sections 50 to unfold. As shown in FIGS. 5A and 5B, as conveyor belt support sections 50 unfold, metal rollers 162 move along the top wall of beams 150 while at the opposite end pivot rod 164 rests on and moves along side walls 156 of channel beams 152. As trailer 12 continues moving away from tail conveyor frame 58, conveyor belt support sections 50 are gently lowered toward the ground as metal rollers 162 and pivot rod 164 travel along the ramp portion 20C. As shown in FIG. 5A, ramp portion 20C includes a first inclined ramp portion 170 and a second declining ramp portion 172, which terminates at a height approximating the lower end of beam 150. The first ramp portion 170 elevates above side wall 156 of channel beam 152. As shown in FIG. 5, when metal roller 162 rides up ramp portion 170, sufficient space is created to insert a support stand 174 under conveyor belt support section 50 adjacent to the pivot plates 84B, 86B, 126 to support groundline 10 above the ground. As metal rollers 162 travel down ramp portion 172, the weight of conveyor belt support section 50 is gradually transferred to the support stand 174.

Figure 6:
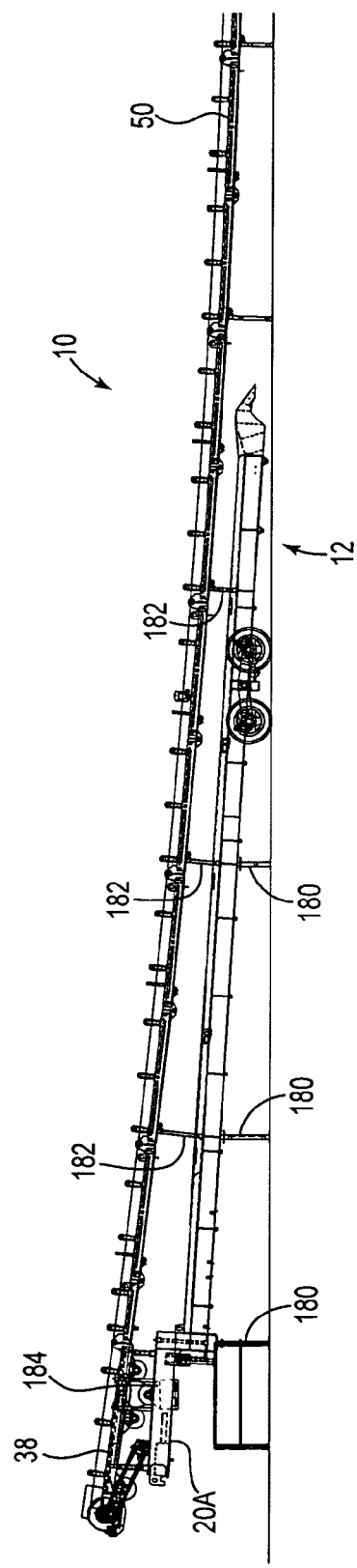
FIG. 6 is a side view of the portable belt conveyor system of the present invention in a conveying configuration.

To complete the fold-out configuration of groundline 10, trailer 12 is moved linearly until all conveyor belt support sections 50 have unfolded. FIG. 6 is a side view of groundline 10 at the end of trailer 12 in a conveying configuration. Groundline 10 is configured to define a gradual slope from head conveyor frame 38 to the ground supported conveyor belt support sections 50. The slope of goundline 10 is defined by first elevating the front support beam portion 20A of trailer 12 and supporting trailer 12 with support stands 180 at spaced locations. In one embodiment, head pulley 32 is elevated to about 12.5 feet above the ground. Thereafter, each conveyor belt support section 50 positioned over trailer 12 is supported by support stands 182 relative to beams 150 adjacent to each end configured with pivot plates 84B, 86B, 126. Placement of support stands 182 is accomplished by elevating the conveyor belt support section 50 at the location to be supported with a fork lift or other similar hydraulic lifting equipment. With groundline 10 fully deployed a conveying run of about 500 feet is easily created in about an hour of set-up time. The conveyor belt (not shown) is appropriately tensioned as is known in the art. In one embodiment, a weight 184 is connected to tension pulley 36 engaged with the conveyor belt.

When it is desired to relocate portable groundline 10, the conveyor belt support sections 50 can be quickly and easily re-loaded onto trailer 12. Support stands 182 are removed thereby allowing each metal roller 162 positioned above trailer 12 to engage the top wall of beams 150 and each pivot rod positioned above trailer 12 to engage side walls 156 of channel beams 152. With trailer 12 hitched to a transport vehicle, trailer 12 is directed along a reverse course that was traveled to deploy the groundline, which places adjacent conveyor belt support sections 50 under compression. Because pivot rod 164 is elevated relative to the metal rollers 162, the adjacent ends of the conveyor belt support sections 50 associated with pivot plates 84B, 86B and 134 begin to elevate thereby allowing the adjacent support sections 50 to fold together. Alternatively, the end of a metal pry rod is positioned between the side wall 156 and the pivot point defined by plates 84B, 86B and 134 to provide assistance in initiating the folding sequence of adjacent support sections 50. Conveyor belt support sections resting on the ground are guided up ramp portion 172 of the trailer ramp portion 2C. When the end of a conveyor belt support section associated with ground support stands 174 approaches the top of ramp portion 172, support stand 174 is manually removed. The loading process continues until all conveyor belt support sections 50 are in the transport configuration. The tail conveyor frame 58 is then lifted with the aid of a bucket loader or similar hydraulic lift equipment. To aid in securing the portable groundline for transportation, one or more straps are secured between support sections 50 and trailer 12.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific idler roll retainer clips discussed herein. Therefore, it is intended that this invention be limited only by the claims and the equivalents thereof.

What is claimed is:

1. A belt conveyor system for creating an overland material transport assembly on a ground surface, the belt conveyor system comprising:

a frame configured for transportation over the ground surface, the frame comprising a first end, a second end and first and second elongate rails, each of the first and second elongate rails having a first support surface and a second support surface spaced from the first support surface;

a plurality of pivotally connected conveyor belt support sections supportable on the frame in a transport configuration wherein the plurality of support sections are accordion-folded relative to one another and are generally perpendicular to the first and second elongate rails, and movable to a material transport configuration wherein the plurality of support sections are generally parallel to the first and second rails;

a head pulley assembly mounted to the first end of the frame;

a tail pulley assembly mounted to one of the conveyor belt support sections; and a belt conveyor carried by the head pulley assembly, the plurality of conveyor belt support sections and the tail pulley assembly.

* * * * *